United States Patent [19]

Tanaka et al.

[11] Patent Number: 4,470,072
[45] Date of Patent: Sep. 4, 1984

[54] METHOD OF BAND COMPRESSION

[75] Inventors: Akiyoshi Tanaka, Kawasaki; Kunio Sannomiya, Machida; Hiroaki Kotera; Kunio Yoshida, both of Kawasaki; Yoshihiro Uno, Machida; Hiroaki Miwa, Kawasaki, all of Japan

[73] Assignees: Matsushita Electric Industrial Co., Osaka; Matsushita Graphic Communications Systems, Inc., Tokyo, both of Japan

[21] Appl. No.: 416,175

[22] Filed: Sep. 9, 1982

Related U.S. Application Data

[63] Continuation of Ser. No. 196,335, Oct. 14, 1980.

[30] Foreign Application Priority Data

Oct. 17, 1979 [JP] Japan .................................. 54-134595

[51] Int. Cl.$^3$ .............................................. H04N 7/12
[52] U.S. Cl. ..................................... 358/260; 358/135
[58] Field of Search ............... 358/133, 135, 136, 260, 358/261, 138; 382/41

[56] References Cited

U.S. PATENT DOCUMENTS 3,937,871 2/1976 Robinson .............................. 358/260
4,213,154 7/1980 Ono .................................... 358/260

FOREIGN PATENT DOCUMENTS 2416728 10/1975 Fed. Rep. of Germany ...... 358/260
54-120521 9/1979 Japan .................................. 358/260
1443651 7/1976 United Kingdom .............. 358/133
2016872 9/1979 United Kingdom ................ 358/260

Primary Examiner—Joseph A. Orsino, Jr.
Attorney, Agent, or Firm—Stevens, Davis, Miller & Mosher

[57] ABSTRACT

In a band compression method using an adaptive prediction system preferably applicable to facsimile transmission, a method of selecting picture elements to be referred (hereinafter defined as reference picture elements) for predicting an information value of a picture element wherein the reference picture elements are not selected uniformly and continuously from the neighborhood of the predicted picture element, but a group of picture elements (the first order picture elements) adjacent to the predicted picture element and further a group of picture elements of equal or higher order than the third order are selected as reference picture elements by excluding those shaded picture elements which lie on lines connecting the predicted picture element and the first order picture elements.

1 Claim, 7 Drawing Figures

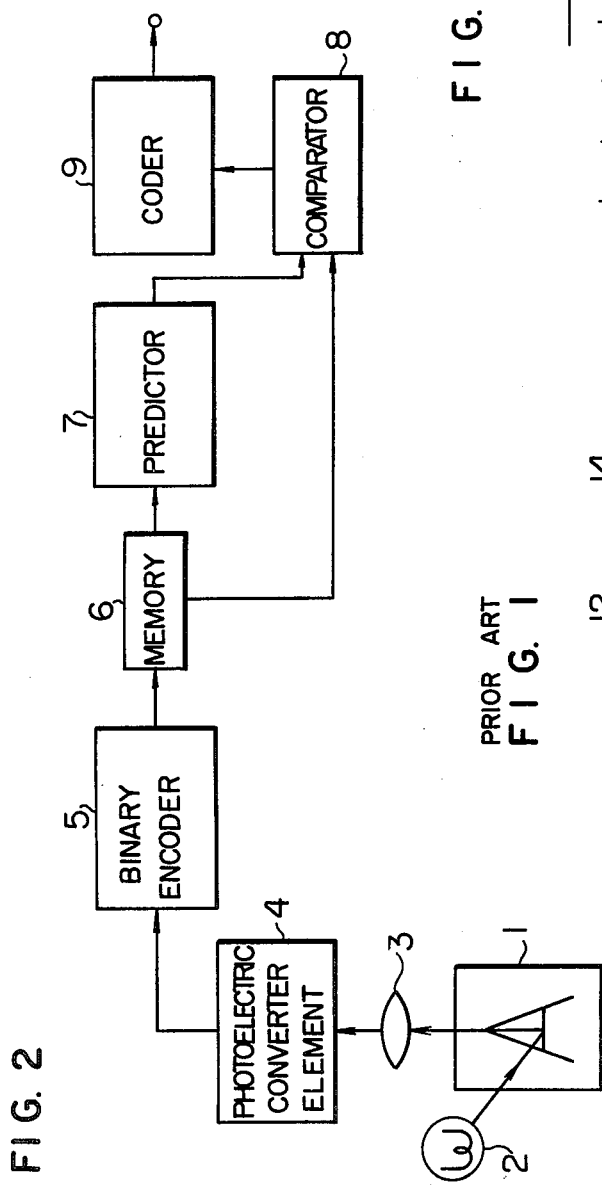
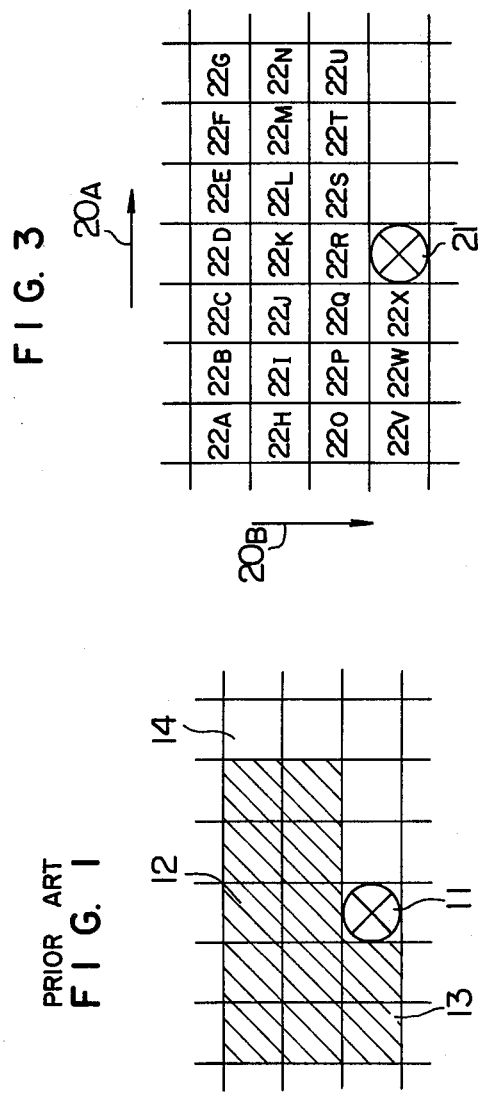

METHOD OF BAND COMPRESSION

This is a Continuation of application Ser. No. 196,335 filed Oct. 14, 1980.

BACKGROUND OF THE INVENTION

This invention relates to an improvement of a signal band compression method, which aims at decreasing the quantity of information required in telegraph or facsimile transmission or recording, by reducing the redundancy of image information.

In facsimile, etc., a black and white character-picture indicating plane is scanned and the scanned output is binary coded. Since the resultant series of picture signals has a redundancy, it can not be accepted as an efficient method to transmit it in its original form. So, various band compression methods are nowadays proposed to eliminate a redundant part out of the binary-coded picture image information. In spite of considerable effects, a sufficient reproduction characteristic has not yet been obtained.

An adaptive prediction method is one of the prior art band compression methods. This method comprises a preliminary process in which the information value of a selected picture element is predicted by using peripheral picture elements thereof and converting their information into a signal expressing the predicted result, and comprises a means for coding this converted signal to telegraph-transmit or to record it. In such a method, the compression ratio is much dependent on the preliminary process.

SUMMARY OF THE INVENTION

This invention relates to a preliminary signal-processing method in the adaptive prediction system. Namely, the invention improves the band compression method using the adaptive prediction system, in order to realize a large band compression effect. In this system, several picture elements (reference picture elements) are selected in order to predict the information value of a picture element (predicted picture element). It is not appropriate, from a practical viewpoint, to increase the number of reference picture elements in an unlimited fashion although a certain effect may be thereby expected. In a prior art method, an allowed number of reference picture elements are selected uniformly and continuously from the peripheral picture elements of the picture element to be predicted. In such a method, since there are a plurality of reference picture elements having a similar characteristic or picture information to that of the predicted picture element, insufficient band compression effect is obtained.

According to this invention, information is obtained as much as possible from various boundaries of a predicted picture element in order to increase the prediction coincidence rate and also increase the band compression ratio. To attain this object, reference picture elements are selected not only from a group of picture elements adjacent to the predicted picture element (first order picture element), but also from a group of picture elements of higher than or equal to the third order (picture elements having no "shaded relation" from the predicted picture element) by excluding picture elements lying on extensions of the predicted picture element and the first order picture elements (picture elements having a "shaded relation" with the predicted picture element, which are hereinbelow called "shaded elements"). Therefore, even with a limited number of such reference picture elements, a large amount of information is obtained, which ensures more exact prediction of the value of a predicted picture element and gives a large effect of increasing the band compression ratio.

BRIEF DESCRIPTION OF THE DRAWINGS

FIG. 1 shows an example of the arrangement of a predicted picture element and reference picture elements according to a prior-art adaptive prediction method.

FIG. 2 is a block diagram showing an example of a facsimile transmitter to which this invention is applied.

FIG. 3 shows an arrangement of a predicted picture element and its peripheral picture elements.

DESCRIPTION OF THE PREFERRED EMBODIMENT

Figure 4A:
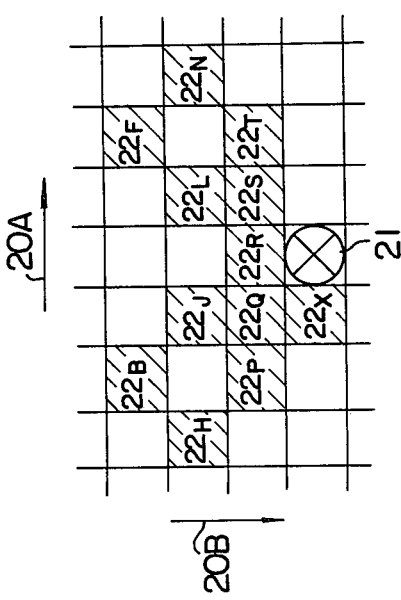
FIGS. 4a to 4d show arrangements of a predicted picture element and selected reference picture elements as used in an adaptive prediction method according to this invention.

In order to help understand this invention, some technical terms used throughout this specification will be defined as follows.

(a) When an original two-dimensional character-picture image plane to be transmitted is divided into an array of infinitesimal regions having a constant spacing in such a manner that it is covered with these infinitesimal regions, such an infinitesimal region is defined as a picture element.

(b) When a character-picture image plane is scanned and read, the read value of the picture element is defined as the color of the picture element.

(c) A picture element which becomes an object of the present signal conversion for the purpose of suppression of redundancy is defined as a predicted picture element.

(d) A picture element which is referred to as predicting the color of a predicted picture element and scanned prior to the predicted picture element is defined as a reference picture element.

(e) The predicted picture element is defined as a zero-order picture element. Picture elements which form a first loop (or group) and surround and contact with the zero order picture element either through a point or a line contact are defined as first-order picture elements. Picture elements which form an n-th loop (or group) and surround and contact with a picture element of (n-1)th order either through a point or line contact are defined as picture elements of n-th order.

(f) When a picture element is assumed to be a figure, the center (centroid) of the figure is defined as a center of the picture element.

(g) When the center of any reference picture element of greater order than n-th order does not lie on a line connecting the center of a predicted picture element A and the center of a reference picture element of first order B, it is defined that the reference picture element has no shaded relation with the predicted picture element A.

In the preliminary process in the adapted prediction, it is said that a higher prediction coincidence rate is obtained as the number of reference picture elements is made larger. In recent technology, one to twelve reference picture elements are used. Although to use more than twelve reference picture elements is possible, it is seldom the case because the predictor means becomes voluminous and any marked increase in the prediction coincidence rate can not be expected in spite of the large capacity of the predictor.

Although in the following description a case with twelve reference picture elements will be described for the sake of explanation, the idea of this invention may also be applied to a case with a different number of picture elements.

According to this invention, which relates to a method of selecting reference picture elements used for generating a prediction coincidence-noncoincidence signal by a binary signal obtained by scanning a typical character-picture manuscript, a means is provided which has a higher redundancy suppression effect of image information than in a prior art, and hence, has a large band-compression characteristic.

In the construction of a predictor, the number of reference picture elements is limited. In the prior art technique, it has been believed that the picture elements adjacent to a predicted picture element have a large correlation with the latter, and that it is reasonable as a selection method to take reference picture elements continuously in the neighborhood of the predicted picture element. FIG. 1 shows an example of the arrangement of reference picture elements according to the idea, where the reference numeral 11 denotes a predicted picture element while a part 12 shown by oblique lines denotes a group of reference picture elements.

According to this invention, with a limited number of reference picture elements, the reference picture elements are selected from the picture elements, which contain information on the direction of the color boundary of an original image and which have no shaded relation with the predicted picture element, rather than selected continuously from the picture elements in the neighborhood of the predicted picture element, whereby the concidence rate of prediction is largely promoted.

FIG. 2 shows a block diagram of the circuit elements which are necessary for a facsimile transmitter to which the present invention is applied. The image information in a character-picture manuscript 1 is illuminated by a scanning light point of a light source 2. The reflected light is sent through a lens 3 to a photoelectric converter element 4, where it is converted into an electric signal depending on the light and shade (black and white) of the manuscript. The electric signal for each picture element is encoded into a binary value of either "0" or "1" by a binary encoder 5, and stored in a memory 6 in a form corresponding to the array of picture elements. Reference picture elements are selected from the picture or image signals stored in the memory to generate a prediction signal for a predicted picture element. Their binary-valued pattern is transmitted to a predictor 7. Usually, the larger the number of reference picture elements, the better the coincidence rate of prediction is. However, due to restriction from current hardware technology, the number is normally chosen from one to twelve. After reference picture elements are selected at some relative positions with respect to the predicted picture element, the prediction of the latter is done by the predictor 7. From the black and white combination of the reference picture elements, whether the predicted picture element is black or white is predicted with a probability of P% (P≧50%). The predictor has within itself a prediction table, or a logic function, with which the color of the predicted picture element is decided from the color combination of the reference picture elements. The result of prediction is converted into a signal of either "0" or "1" and sent to a comparator 8. The binary-valued image signals are stored in the memory 6, while the signal of the predicted picture element is sent to the comparator. The comparator 8 compares the received predicted value with the actual value, and generates a coincidence signal (e.g. "0") when the both values are equal, or generates a noncoincidence signal (e.g. "1") when the both values are not equal. The coincidence or non-coincidence signal is sent to a coder 9. The signal series of coincidence and non-coincidence generated in the comparator 8 is encoded in the coder 9, for which various coding systems may be used. For example, the publicly-known Huffman code may be used for coding. The coded image signal is stored in a buffer memory temporarily, and sent through a modem to a receiver as occasion demands. In the receiver, an inverse process to that of the transmitter is taken to reproduce the image signal, which then is sent to a printing means to reproduce a picture image.

Next, explanation will be made of a case with selecting twelve reference picture elements. In FIG. 2, selection is made from the reference picture elements existing in the memory 6.

FIG. 3 shows the periphery of a predicted picture element 21 shown by the mark (x) in the memory 6. In order to help understanding of the invention, the same arrangement as that of the picture elements in the previous manuscript is shown. In FIG. 3, the arrow 20A denotes the main scanning direction while the arrow 20B denotes the sub-scanning direction.

In the prior art where the number of reference picture elements is limited to be twelve, reference picture elements 22I, 22J, 22K, 22L, 22M, 22P, 22Q, 22R, 22S, 22T, 22W and 22X are selected for the predicted picture element 21. In the picture elements of the second order, the elements 22I, 22K, 22M and 22W are in the shaded relation with the predicted picture element 21 due to the presence of the elements 22Q, 22R, 22S and 22X respectively. It is herein said that, for example, the elements 22I and 22J, 22J and 22K, 22K and 22L, 22L and 22M are respectively in line contiguous relation to each other, while, for example, the elements 22I and 22A, 22I and 22C, 22I and 22O, 22I and 22Q are in point contiguous relation to each other, and that, for example, the elements 22A, 22I, 22J and 22R are adjacent or contiguous to each other and connected to the predicted picture element 21. In this invention such picture elements as having the shaded relation are not used for the reference picture elements, but the elements of the third order which have no shaded relation with the predicted picture element are used therefor, whereby the prediction coincidence rate is increased. By selecting as the reference picture elements those third order nonshaded elements which are contiguous to each other and connected to the predicted picture element through other selected picture elements, it becomes possible to predict a change of color due to a change of place. FIG. 4 shows embodiments of selecting such reference picture elements. In each embodiment, the number of reference picture elements is limited to twelve, and at least one reference picture element of the order not lower than the third order is used.

FIG. 4a shows a typical embodiment. Of the picture elements shown in FIG. 3, elements 22B, 22F, 22H, 22J, 22L, 22N, 22P, 22Q, 22R, 22S, 22T and 22X are used. The reference picture elements, for example, 22B, 22F, 22H and 22N of the third order are positionally not in shaded relation with the predicted picture element 21, and yet they are contiguous to the elements 22B, 22J, 22L and 22R and to each other and thus are connected to the predicted picture element 21. The compression ratio achieved by selecting such reference picture elements is significantly improved compared to that of the previous example using twelve reference picture elements according to the prior method.

Figure 4C:
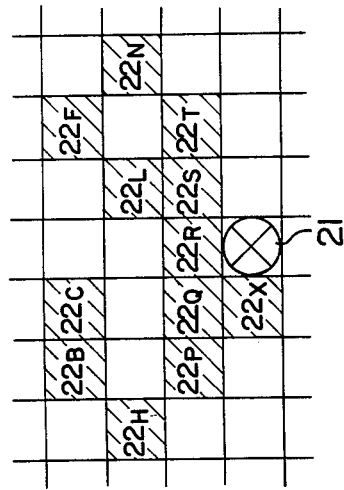
Figure 4B:
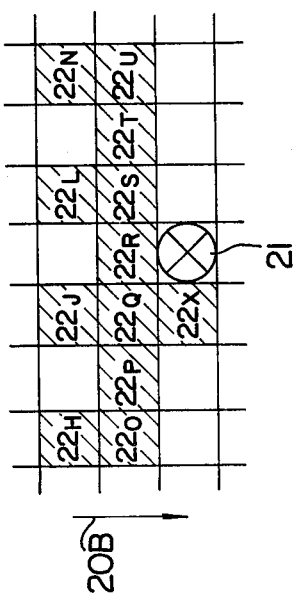

FIG. 4b shows an embodiment where reference picture elements are selected within three scanning lines including the predicted picture element 21.

Figure 4D:
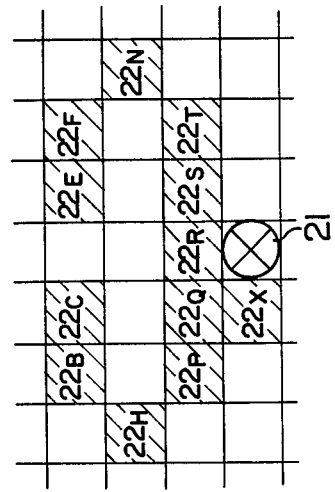

FIGS. 4c and 4d show modifications of FIG. 4a. FIG. 4a shows a case when a picture element 22C is used instead of the element 22J, while FIG. 4d shows a case when picture elements 22C and 22E are used instead of the elements 22J and 22L.

The reason for the increaase of prediction coincidence rate when the selected reference picture elements have no shaded relation is, for example in comparison of the element 22W and 22X, that the predicted value of the picture element 21 is influenced by the color of the reference picture element 22X much more than that of the element 22W, and further that the reference picture elements having no shaded relation contain color information concerning the direction of boundary of an original picture image.

Therefore, under the condition that the total number of reference picture element is limited, it is possible to increase the prediction coincidence rate by selecting them from reference picture elements having no shaded relation with a predicted picture element.

Although the above explanation has been made of a case with twelve reference picture elements, it is needless to say that this invention is also applicable to a case with more than twelve, or less than twelve, reference picture elements.

Although this invention may also be applicable to a case where only reference picture elements of the order up to the second order are used, it is particularly preferred to apply this invention to a case where reference picture elements of higher order(s) not lower than the third order are used.

As described above, this invention relates to a band compression method according to an adaptive prediction system in which a predetermined number of picture elements existing in the vicinity or periphery of a picture element to be predicted are selectively referred to to determine a predicted value of the predicted picture element, and more particularly to a signal band compression method of an adaptive prediction system in which reference picture elements are selected from the picture elements which are adjacent to but not in shaded relation with the predicted picture element, particularly characterized in that the reference picture elements of higher order not less than the third order are selected from only picture elements having no shaded relation with the predicted picture element.

This invention ensures an improved adaptive prediction with an extremely high coincidence rate by using a limited constant number of reference picture elements, and with a large increase in the band compression ratio.

What is claimed is:

1. A band compression method depending upon an adaptive prediction system in which a constant number of picture elements are selected in the neighborhood of a picture element to be predicted to determine the predicted value of said predicted picture element, said band compression method comprising selecting reference picture elements for the determination, which include at least those picture elements which are adjacent to said predicted picture element and other picture elements including picture elements of a third order or higher, said selected third or higher order picture elements being only those which have no shaded relation with said predicted picture element and which are contiguous to each other and connected to said predicted picture element through selected reference picture elements.

* * * * *